US011865859B2

(12) United States Patent
Mori et al.

(10) Patent No.: US 11,865,859 B2
(45) Date of Patent: Jan. 9, 2024

(54) LAYER TRANSFER DEVICE CONTROLLING LOCKING AND UNLOCKING OF COVER BASED ON EVALUATED TEMPERATURES DETERMINED BASED ON TEMPERATURES MEASURED BY TEMPERATURE SENSORS

(71) Applicant: BROTHER KOGYO KABUSHIKI KAISHA, Nagoya (JP)

(72) Inventors: Kentaro Mori, Kasugai (JP); Ryosuke Sakai, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 329 days.

(21) Appl. No.: 17/386,689

(22) Filed: Jul. 28, 2021

(65) Prior Publication Data

US 2021/0354500 A1 Nov. 18, 2021

Related U.S. Application Data

(63) Continuation of application No. PCT/JP2019/020634, filed on May 24, 2019.

(30) Foreign Application Priority Data

Jan. 31, 2019 (JP) ................................ 2019-015903

(51) Int. Cl.
*B44C 1/17* (2006.01)
*B41F 16/00* (2006.01)

(52) U.S. Cl.
CPC ..................................... *B44C 1/17* (2013.01)

(58) Field of Classification Search
None
See application file for complete search history.

(56) References Cited

U.S. PATENT DOCUMENTS

2012/0251174 A1 10/2012 Shirai et al.
2022/0143966 A1* 5/2022 Mori .................... B32B 37/025

FOREIGN PATENT DOCUMENTS

JP 63-47168 A 2/1988
JP 4-245276 A 9/1992
(Continued)

OTHER PUBLICATIONS

International Search Report and Written Opinion issued in corresponding International Patent Application No. PCT/JP2019/020634, dated Jul. 16, 2019.
(Continued)

*Primary Examiner* — Leslie J Evanisko
(74) *Attorney, Agent, or Firm* — Merchant & Gould P.C.

(57) ABSTRACT

A layer transfer device includes: a cover; a heat roller; a controller; temperature sensors including first and second sensors; and a locking member movable between a locking position to lock the cover to a closed position and an unlocking position to permit movement of the cover from the closed position to an open position. The first sensor measures temperature of a first member heated by a multilayer film or a sheet having been heated by the heat roller. The second sensor measures temperature of a second member heated by the heat roller. The controller determines evaluated temperatures based on temperatures measured by the temperature sensors, places the locking member in the locking position when at least one of the evaluated temperatures is not lower than a first threshold value, and places the locking member in the unlocking position when the evaluated temperatures are all lower than the first threshold value.

9 Claims, 11 Drawing Sheets

(56) References Cited

FOREIGN PATENT DOCUMENTS

| | | | |
|---|---|---|---|
| JP | 6-218960 | A | 8/1994 |
| JP | 2001-180630 | A | 7/2001 |
| JP | 2006-142537 | A | 6/2006 |
| JP | 2012-215836 | A | 11/2012 |

OTHER PUBLICATIONS

International Preliminary Report on Patentability issued in corresponding International Patent Application No. PCT/JP2019/020634, dated Jul. 27, 2021.

* cited by examiner

LAYER TRANSFER DEVICE CONTROLLING LOCKING AND UNLOCKING OF COVER BASED ON EVALUATED TEMPERATURES DETERMINED BASED ON TEMPERATURES MEASURED BY TEMPERATURE SENSORS

CROSS REFERENCE TO RELATED APPLICATION

This application is a continuation of international application No. PCT/JP2019/020634 filed May 24, 2019 and claims priority from Japanese Patent Application No. 2019-015903 filed Jan. 31, 2019. The entire contents of the international application and the priority application are incorporated herein by reference.

TECHNICAL FIELD

The present disclosure relates to a layer transfer device.

BACKGROUND

Japanese Patent Application Publication No. 2012-215836 discloses a layer transfer device that transfers a transfer layer to a sheet by heating and pressing together the sheet and a multilayer film including the transfer layer. The multilayer film includes a support layer and a supported layer including the transfer layer.

SUMMARY

In such a conventional layer transfer device, there has been a desire to replace a multilayer film with a new one or remove a jammed sheet.

However, with the conventional layer transfer device, it is difficult to work around the multilayer film since high temperature members are provided in the vicinity of the multilayer film such as a heating component for heating the multilayer film.

In view of the foregoing, it is an object of the present disclosure to provide a layer transfer device in which a user can easily work around the multilayer film.

In order to attain the above and other objects, according to one aspect, the present disclosure provides a layer transfer device including a housing, a cover, a locking member, a heat roller, a plurality of temperature sensors, and a controller. The housing has an opening. The cover is movable between a closed position in which the cover closes the opening and an open position in which the cover opens the opening. The locking member is movable between a locking position in which the locking member locks the cover to the closed position and an unlocking position in which the locking member permits movement of the cover from the closed position to the open position. The heat roller is positioned inside the housing and is configured to heat a multilayer film and a sheet in a state where the cover is at the closed position. The multilayer film and the sheet are conveyed in a first direction in an overlaid state with each other. The multilayer film includes a support layer and a supported layer. The supported layer includes a transfer layer to be transferred to the sheet. The plurality of temperature sensors includes a first sensor and a second sensor. The first sensor is configured to measure temperature of a first member. The first member is heated by one of the multilayer film and the sheet that have been heated by the heat roller. The second sensor is configured to measure temperature of a second member. The second member is heated by the heat roller. The controller is configured to perform: (a) determining a plurality of evaluated temperatures on the basis of a plurality of temperatures measured by the plurality of temperature sensors; (b) placing the locking member in the locking position in a case where at least one of the plurality of evaluated temperatures determined in (a) is equal to or higher than a first threshold value; and (c) placing the locking member in the unlocking position in a case where all of the plurality of evaluated temperatures determined in (a) are lower than the first threshold value.

BRIEF DESCRIPTION OF THE DRAWINGS

The particular features and advantages of the embodiment of the present disclosure as well as other objects will become apparent from the following description taken in connection with the accompanying drawings, in which.

DETAILED DESCRIPTION

1. Overall Structure of Layer Transfer Device

Figure 1:
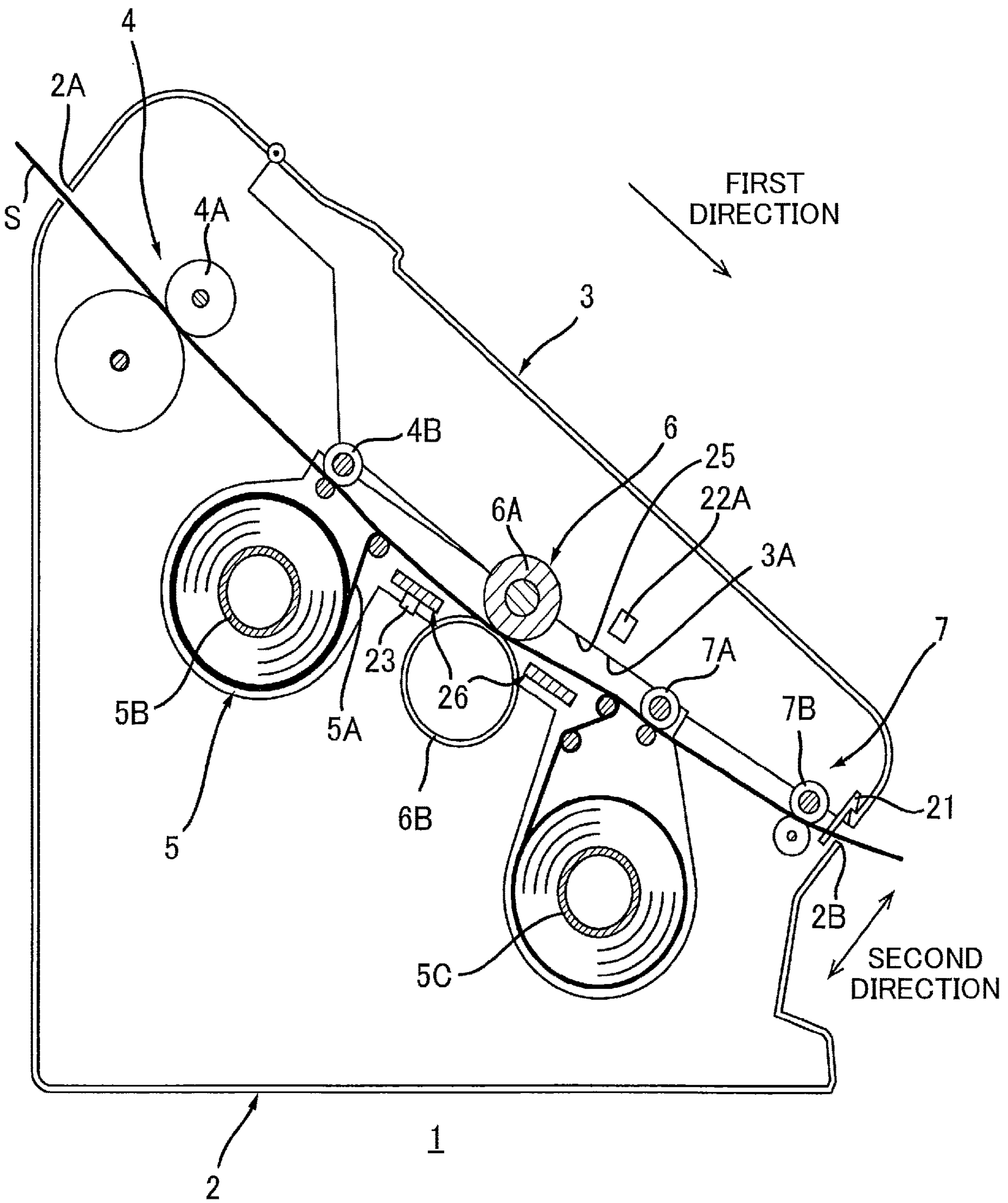
FIG. 1 is a schematic cross-sectional view illustrating the overall structure of a layer transfer device according to one embodiment of the present disclosure.

The overall structure of a layer transfer device 1 according to one embodiment of the present disclosure will be described with reference to FIGS. 1 through 5. As illustrated in FIG. 1, the layer transfer device 1 includes a housing 2, a cover 3, a sheet conveying portion 4, a film unit 5, a transfer portion 6, and a sheet discharge portion 7.

<1.1 Housing>

The housing 2 has a sheet supply opening 2A and a sheet discharge opening 2B. The sheet supply opening 2A is an opening through which a sheet S is supplied to the sheet conveying portion 4. The sheet discharge opening 2B is an opening through which the sheet S is discharged by the sheet discharge portion 7.

Figure 3:
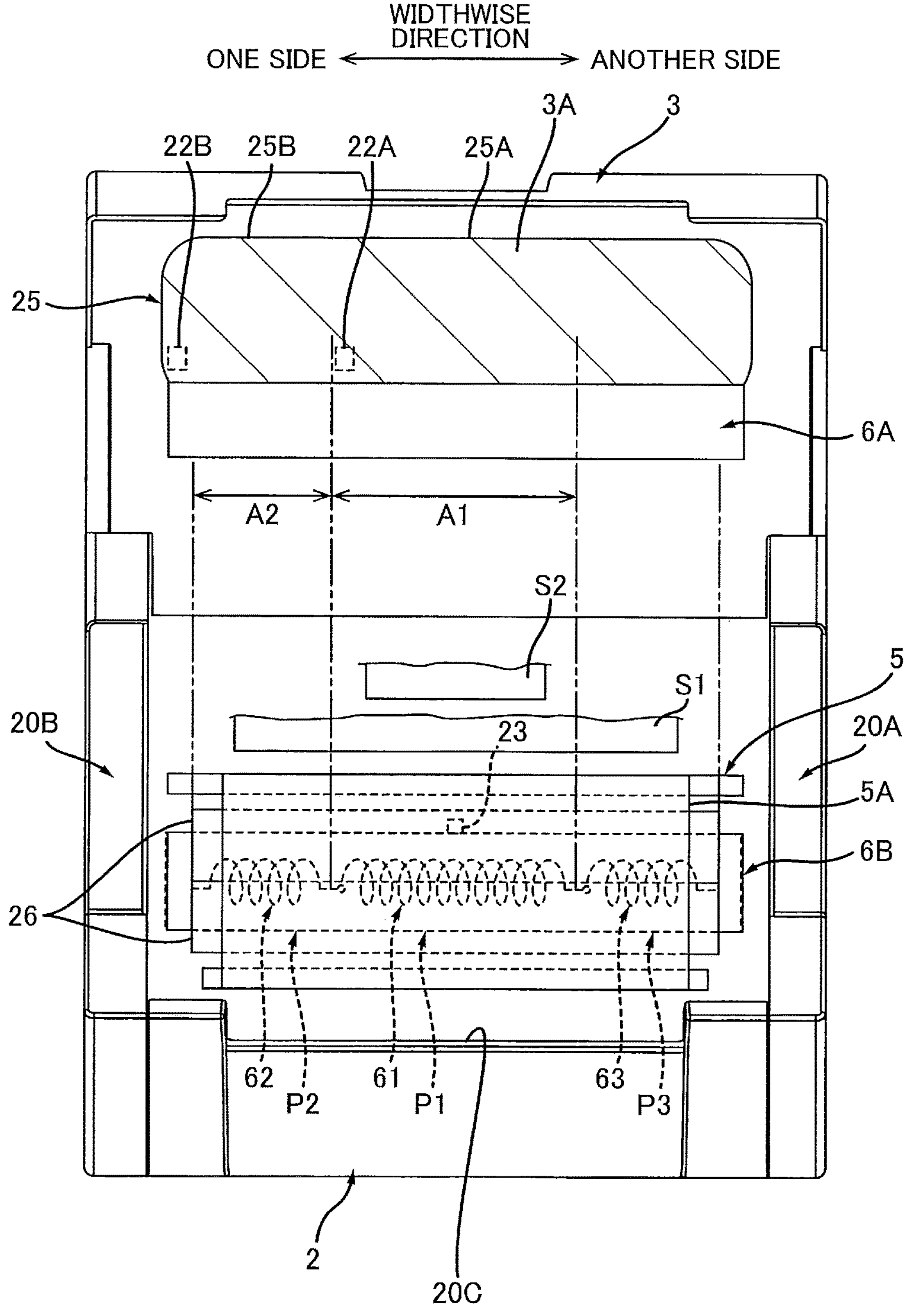
FIG. 3 is a front view of a housing of the layer transfer device in the state illustrated in FIG. 2.

Further, as illustrated in FIG. 3, the housing 2 has side walls 20A and 20B. The housing 2 has an opening 20C. The side wall 20A constitutes one side of the housing 2 in a widthwise direction of the sheet S. The side wall 20B constitutes another side of the housing 2 in the widthwise direction of the sheet S. The side wall 20B is positioned spaced away from the side wall 20A in the widthwise direction. The opening 20C is defined between the side walls 20A and 20B in the widthwise direction.

<1.2 Cover>

Figure 2:
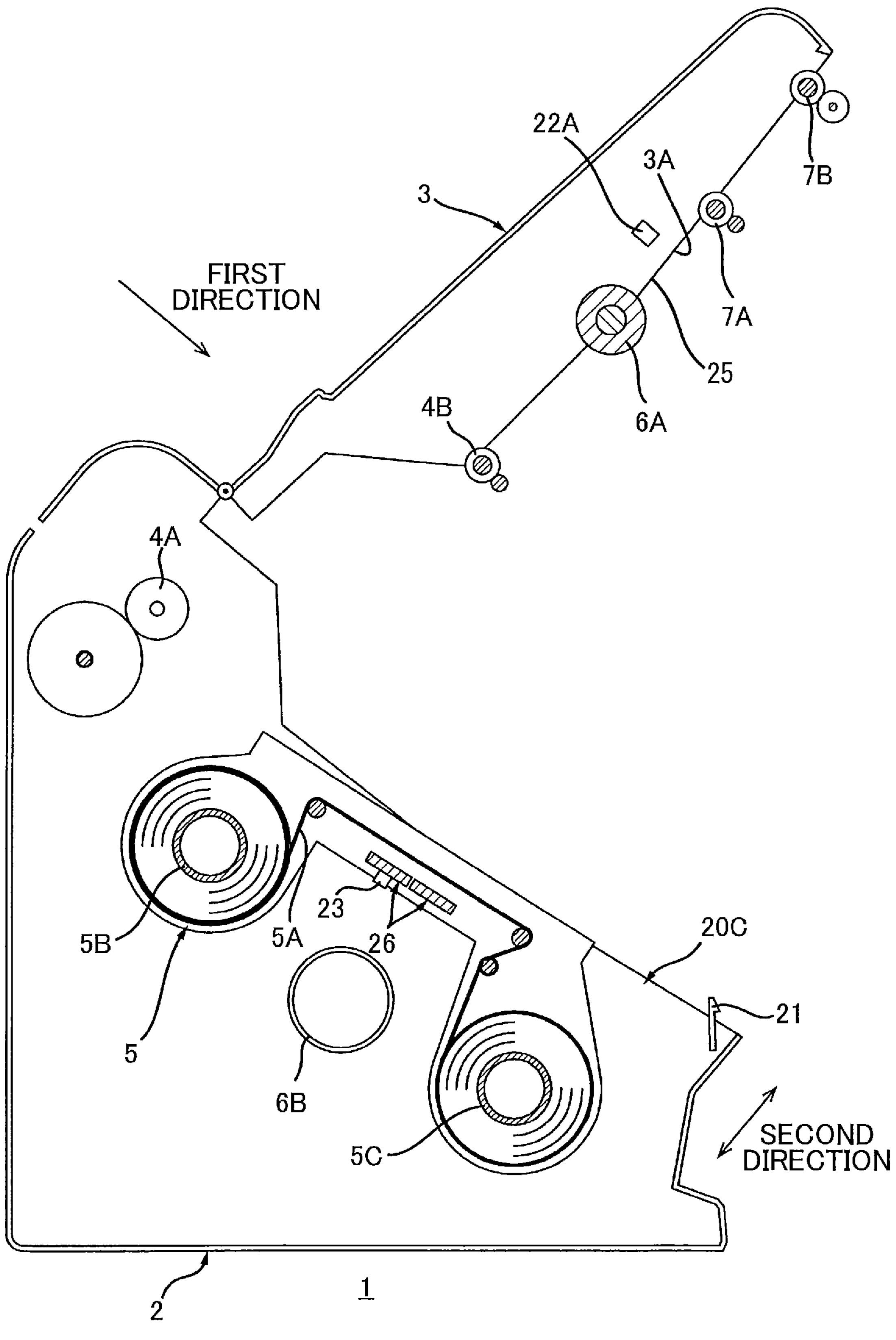
FIG. 2 is a schematic cross-sectional view of the layer transfer device illustrated in FIG. 1, and particularly illustrates state where a cover of the layer transfer device is at an open position.

As illustrated in FIGS. 1 and 2, the cover 3 is movable between a closed position illustrated in FIG. 1 and an open position illustrated in FIG. 2. More specifically, the cover 3 is pivotally movable between the closed position and the open position about an axis extending in the widthwise direction. The opening 20C is closed by the cover 3 when the cover 3 is at the closed position, and the opening 20C is open when the cover 3 is at the open position. The cover 3 has a guide surface 3A. The guide surface 3A contacts the sheet S when the cover 3 guides the sheet S.

<1.3 Sheet Conveying Portion>

As illustrated in FIG. 1, the sheet conveying portion 4 is supplied with the sheet S in a state where the film unit 5 is mounted in the housing 2 and the cover 3 is at the closed position. The sheet conveying portion 4 is configured to convey the supplied sheet S toward the transfer portion 6. Specifically, the sheet conveying portion 4 includes a pick-up roller 4A and a conveyer roller 4B.

The pick-up roller 4A is provided inside the housing 2. The pick-up roller 4A is configured to convey, toward the conveyer roller 4B, the sheet S that has been supplied to the sheet conveying portion 4.

The conveyer roller 4B is provided on the cover 3. The conveyer roller 4B is configured to convey, toward the transfer portion 6, the sheet S that has been conveyed from the pick-up roller 4A.

<1.4 Film Unit>

As illustrated in FIG. 2, the film unit 5 is mountable in the housing 2 through the opening 20C in a state where the cover 3 is at the open position. The film unit 5 includes a multilayer film 5A, a supply reel 5B, and a take-up reel 5C.

<1.4.1 Multilayer Film>

Figure 4A:
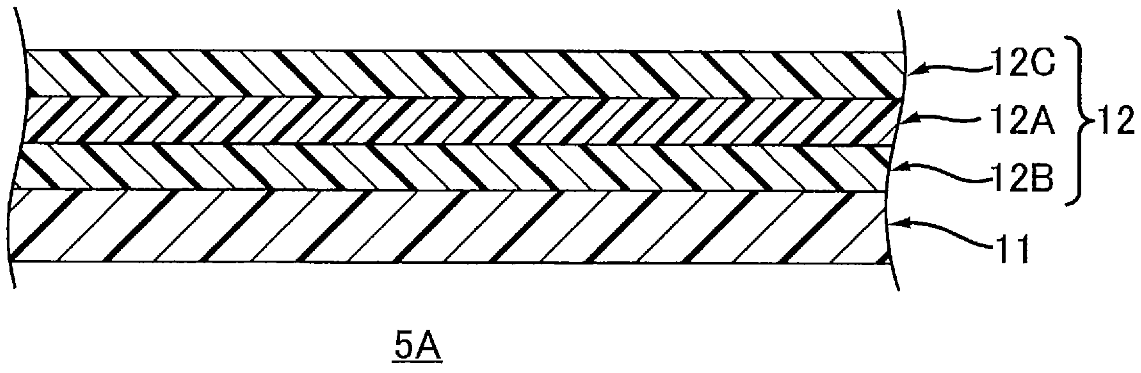
FIG. 4A is a cross-sectional view of a multilayer film illustrated in FIG. 1.

As illustrated in FIG. 4A, the multilayer film 5A includes a support layer 11 and a supported layer 12. The support layer 11 is a film made from resin such as polyethylene terephthalate and polyolefin. The supported layer 12 is supported by the support layer 11. The supported layer 12 includes a transfer layer 12A, a release layer 12B, and an adhesive layer 12C.

The transfer layer 12A is configured to be transferred to the sheet S. Upon transfer of the transfer layer 12A to the sheet S, an image such as character(s) and pattern(s) is formed on the sheet S. For example, the transfer layer 12A includes at least one of a metal layer, a pigmented layer, and a protective layer.

The metal layer is made of metal such as aluminum, tin, gold, or silver. In a case where the transfer layer 12A includes the metal layer, an image having metallic luster is formed on the sheet S upon transfer of the transfer layer 12A to the sheet S. The pigmented layer is made from thermoplastic resin containing coloring agent or pigment. In a case where the transfer layer 12A includes the pigmented layer, a color image is formed on the sheet S upon transfer of the transfer layer 12A to the sheet S. The protective layer is made from a transparent thermoplastic resin not containing coloring agent or pigment. In a case where the protective layer includes the transfer layer 12A, upon transfer of the transfer layer 12A to the sheet S, a part of the sheet S that has the transfer layer 12A transferred thereto is protected.

Figure 4B:
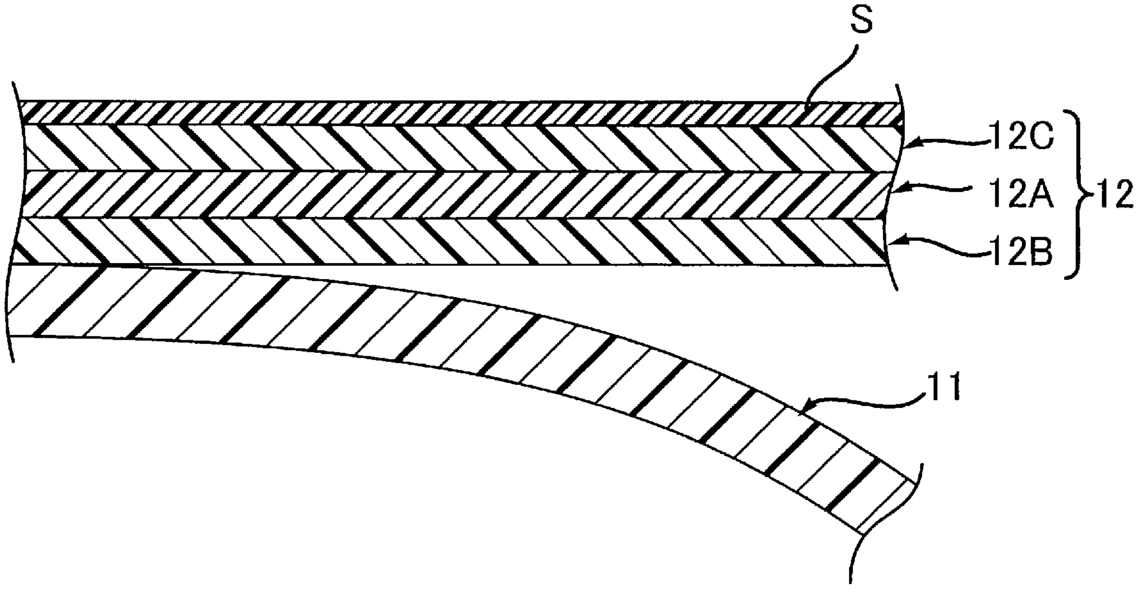
FIG. 4B is a cross-sectional view of the multilayer film in which a support layer is peeled off from a supported layer.

The release layer 12B is interposed between the support layer 11 and the transfer layer 12A. With this structure, the transfer layer 12A can be peeled from the support layer 11, using the release layer 12B as a boundary of separation, as illustrated in FIG. 4B.

The adhesive layer 12C is configured to bond the transfer layer 12A to the sheet S. The adhesive layer 12C is in contact with the sheet S in a state where the multilayer film 5A is in contact with the sheet S. The adhesive layer 12C is positioned between the transfer layer 12A and the sheet S in a state where the multilayer film 5A is in contact with the sheet S. The adhesive layer 12C is made from thermoplastic resin such as vinyl chloride and acrylic resin.

<1.4.2 Supply Reel>

As illustrated in FIG. 1, the multilayer film 5A to be supplied to the transfer portion 6 is wound about the supply reel 5B. With this structure, the film unit 5 holds the multilayer film 5A. The supply reel 5B is a hollow cylindrical shape extending in the widthwise direction. The supply reel 5B is rotatable about its axis extending in the widthwise direction.

<1.4.3 Take-Up Reel>

The take-up reel 5C is positioned apart from the supply reel 5B. Specifically, the take-up reel 5C is positioned at the opposite side of the transfer portion 6 from the supply reel 5B. The take-up reel 5C is configured to take up the support layer 11 of the multilayer film 5A. The take-up reel 5C is a hollow cylindrical shape extending in the widthwise direction. The take-up reel 5C is rotatable about its axis extending in the widthwise direction. The multilayer film 5A is conveyed from the supply reel 5B toward the take-up reel 5C by rotation of the take-up reel 5C. Specifically, the multilayer film 5A is conveyed in a first direction from the supply reel 5B toward the take-up reel 5C in a state where the film unit 5 is mounted in the housing 2 and the cover 3 is at the closed position. The first direction crosses the widthwise direction.

<1.5 Transfer Portion>

The transfer portion 6 is configured to transfer the transfer layer 12A of the multilayer film 5A to the sheet S that has been conveyed by the sheet conveying portion 4. The transfer portion 6 includes a pressure roller 6A and a heat roller 6B. That is, the layer transfer device 1 includes the pressure roller 6A and the heat roller 6B.

<1.5.1 Pressure Roller>

The pressure roller 6A is provided on the cover 3. In a state where the film unit 5 is mounted in the housing 2 and the cover 3 is at the closed position, the pressure roller 6A and the heat roller 6B nip the multilayer film 5A therebetween in cooperation with each other. Specifically, the pressure roller 6A contacts the adhesive layer 12C (see FIG. 4A) of the supported layer 12 of the multilayer film 5A in a state where the film unit 5 is mounted in the housing 2 and the cover 3 is at the closed position.

<1.5.2 Heat Roller>

Figure 5:
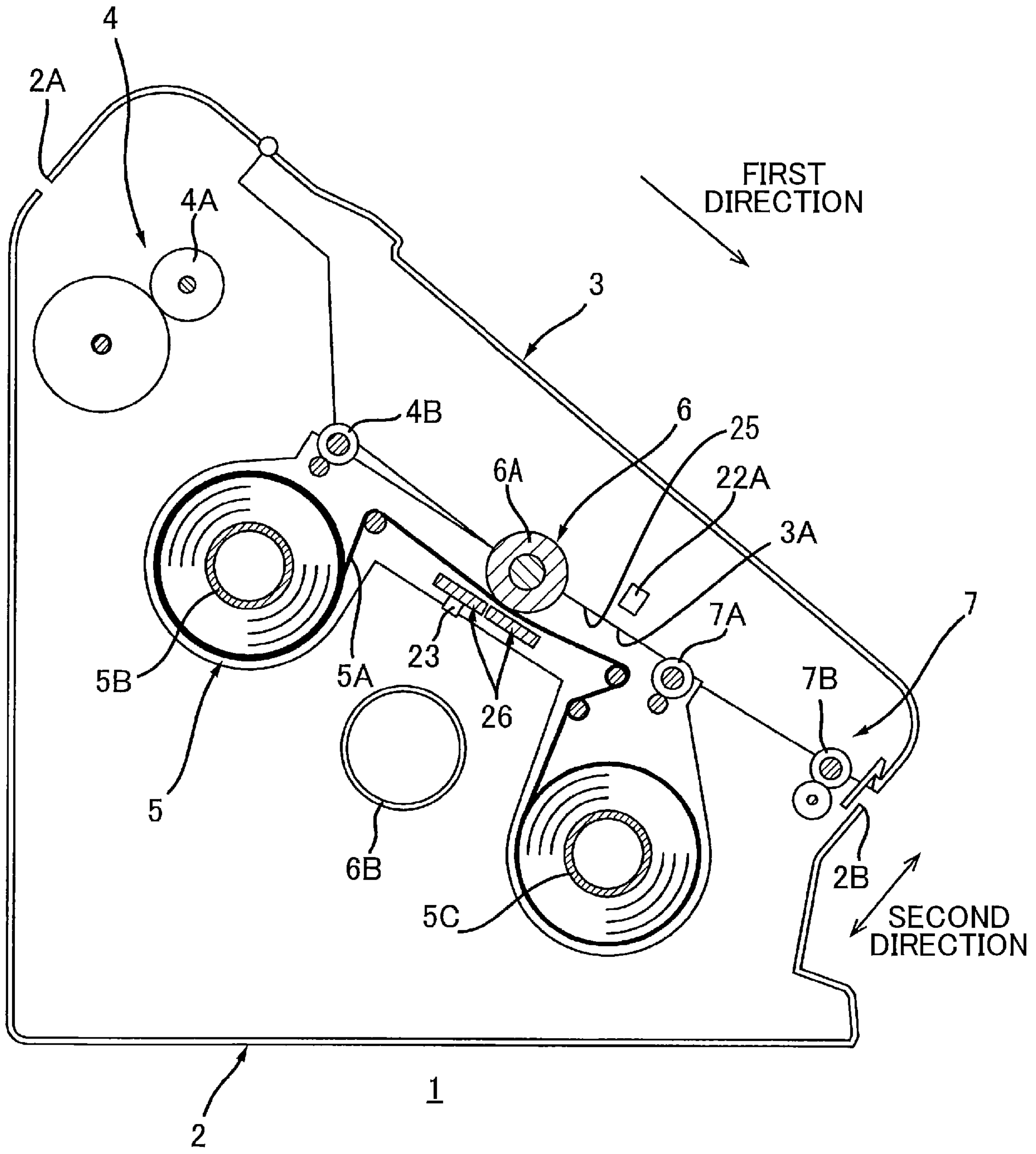
FIG. 5 is a schematic cross-sectional view of the layer transfer device illustrated in FIG. 1, and particularly illustrating a state where a heat roller of the layer transfer device is at a second position.

The heat roller 6B is positioned inside the housing 2. The heat roller 6B is positioned between the supply reel 5B and the take-up reel 5C of the film unit 5 in a state where the film unit 5 is mounted in the housing 2. As illustrated in FIGS. 1 and 5, the heat roller 6B is movable between a first position (see FIG. 1) and a second position (see FIG. 5) in a state where the cover 3 is at the closed position. Specifically, the heat roller 6B is movable in a second direction crossing both the first direction and the widthwise direction.

As illustrated in FIG. 1, the heat roller 6B approaches the pressure roller 6A when the heat roller 6B moves to the first position in a state where the cover 3 is at the closed position. The heat roller 6B contacts the support layer 11 (see FIG. 4A) of the multilayer film 5A when the pressure roller 6A moves to the first position in a state where the film unit 5 is mounted in the housing 2 and the cover 3 is at the closed position. Hence, the heat roller 6B heats the multilayer film 5A in a state where the cover 3 is at the closed position. In a state where the film unit 5 is mounted in the housing 2 and the cover 3 is at the closed position, the multilayer film 5A moving from the supply reel 5B toward the take-up reel 5C passes through a portion between the pressure roller 6A and the heat roller 6B in the first direction.

The sheet S supplied to the sheet conveying portion 4 is conveyed toward the transfer portion 6 by the pick-up roller 4A and the conveyer roller 4B, and passes through the portion between the pressure roller 6A and the heat roller 6B in an overlaid state with the multilayer film 5A. That is, within the housing 2, the multilayer film 5A is conveyed in the first direction in a state where the multilayer film 5A and the sheet S are overlaid with each other. At this time, the multilayer film 5A and the sheet S are heated by the heat roller 6B, and are pressed by the pressure roller 6A and the heat roller 6B. Hence, the transfer layer 12A of the multilayer film 5A is bonded to the sheet S through the adhesive layer 12C.

Then, the support layer 11 is taken up by the take-up reel 5C in a state where the transfer layer 12A is bonded to the sheet S, so that the support layer 11 is peeled off from the transfer layer 12A at the release layer 12B as a boundary as illustrated in FIG. 4B. Hence, the transfer layer 12A is transferred to the sheet S from the support layer 11.

As illustrated in FIG. 5, the heat roller 6B separates from the pressure roller 6A when the heat roller 6B moves to the second position in a state where the cover 3 is at the closed position. The heat roller 6B separates from the multilayer film 5A when the heat roller 6B moves to the second position in a state where the film unit 5 is mounted in the housing 2 and the cover 3 is at the closed position. Unnecessary heating and pressing to the multilayer film 5A can be prevented by positioning the heat roller 6B at the second position when neither heating nor pressing to the multilayer film 5A is required.

In the present embodiment, the heat roller 6B is positioned at the second position in a state where no sheet S is supplied to the sheet conveying portion 4. Further, in the present embodiment, the heat roller 6B is at the second position in a state where a controller 24 (described later) is not in receipt of a layer transfer instruction. Incidentally, the heat roller 6B is positioned at the second position even in a state where the cover 3 is at the open position.

Further, the heat roller 6B includes a first heater 61, a second heater 62, and a third heater 63 as illustrated in FIG. 3. The first heater 61 is configured to heat a first portion P1 of the heat roller 6B. The first portion P1 constitutes a center portion of the heat roller 6B in the widthwise direction. The first portion P1 is configured to contact a center portion in the widthwise direction of a sheet S1 whose type is a first type. Examples of the sheet S1 of the first type includes a plain paper having A4 size and a glossy paper having A4 size. Further, the first portion P1 is configured to contact the entire portion in the widthwise direction of a sheet S2 whose type is a second type. The sheet S2 of the second type has a width smaller than that of the sheet S1 of the first type. Examples of the sheet S2 of the second type includes a postcard and an envelope.

The second heater 62 is configured to heat a second portion P2 of the heat roller 6B. The second portion P2 constitutes one end portion of the heat roller 6B in the widthwise direction. That is, the second heater 62 is at a position different from the position of the first heater 61 in the widthwise direction. The second portion P2 is configured to contact one end portion in the widthwise direction of the sheet S1 of the first type. The second portion P2 does not contact the sheet S2 of the second type.

The third heater 63 is configured to heat a third portion P3 of the heat roller 6B. The third portion P3 constitutes the other end portion in the widthwise direction of the heat roller 6B. The third heater 63 is positioned at the opposite side of the first heater 61 from the second heater 62 in the widthwise direction. The third portion P3 is configured to contact the other end portion in the widthwise direction of the sheet S1 of the first type. The third portion P3 does not contact the sheet S2 of the second type.

<1.6 Sheet Discharge Portion>

The sheet discharge portion 7 is configured to discharge, to the outside of the layer transfer device 1, the sheet S that has passed through the portion between the pressure roller 6A and the heat roller 6B. The sheet discharge portion 7 includes a conveyer roller 7A and a discharge roller 7B as illustrated in FIG. 1.

The conveyer roller 7A is provided on the cover 3. The conveyer roller 7A is configured to convey, toward the discharge roller 7B, the sheet S that has passed through the portion between the pressure roller 6A and the heat roller 6B. The discharge roller 7B is provided on the cover 3. The discharge roller 7B is configured to discharge, to the outside of the layer transfer device 1, the sheet S that has been conveyed by the conveyer roller 7A.

2. Details of Layer Transfer Device

Figure 6:
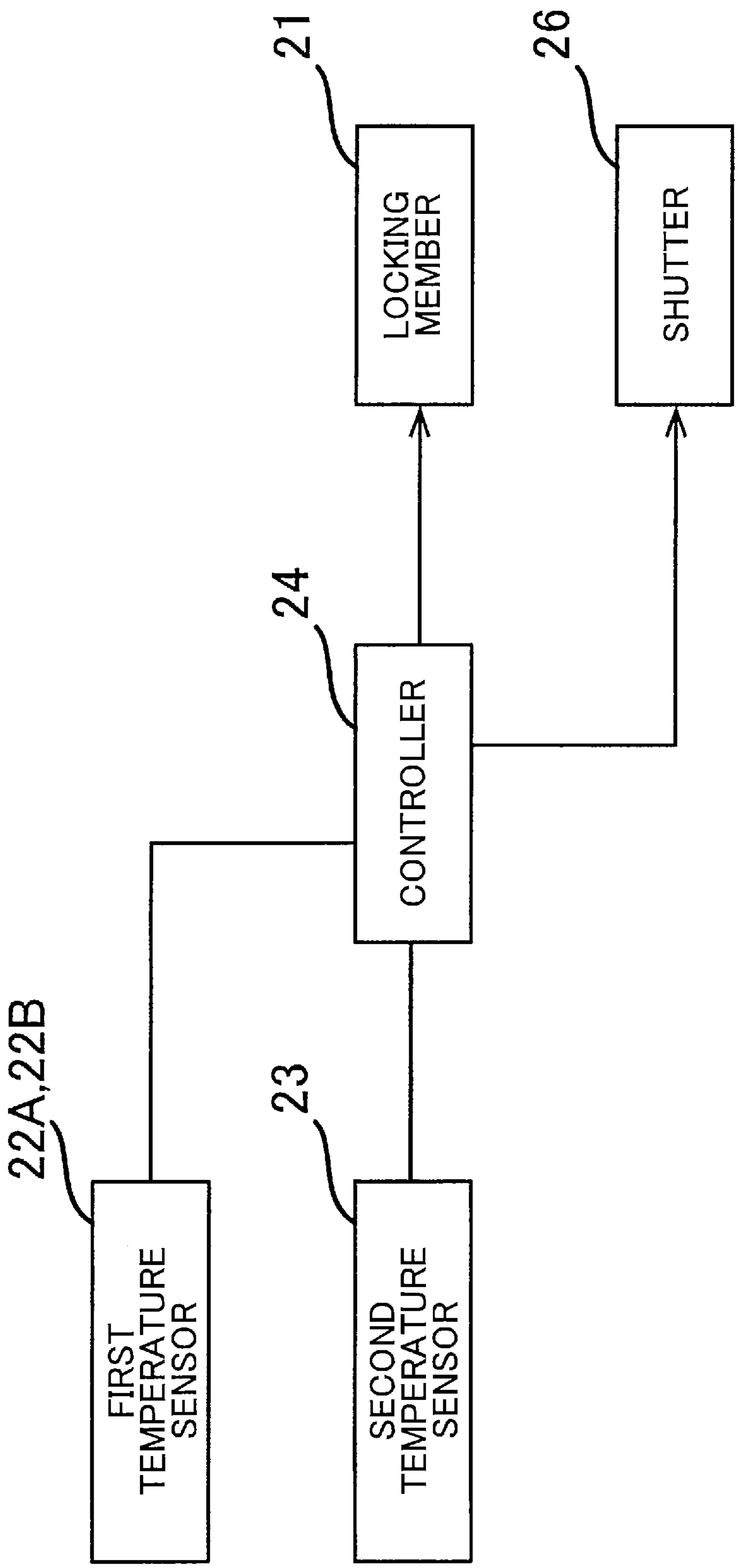
FIG. 6 is a block diagram of the layer transfer device illustrated in FIG. 1.

Details of the layer transfer device 1 will next be described with reference to FIGS. 1 through 3 and 6. As illustrated in FIG. 6, the layer transfer device 1 further includes a locking member 21, a shutter 26, two first temperature sensors 22A and 22B, a second temperature sensor 23, and the controller 24. The first temperature sensors 22A and 22B and the second temperature sensor 23 are an example of the "plurality of temperature sensors." The first temperature sensor 22A is an example of the "first sensor" and is also an example of the "third sensor." The first temperature sensor 22B is an example of the "third sensor" and is also an example of the "first sensor." The second temperature sensor 23 is an example of the "second sensor."

<2.1 Locking Member>

As illustrated in FIGS. 1 and 2, the locking member 21 is movable between a locking position (FIG. 1) and an unlocking position (FIG. 2). The locking member 21 is moved between the locking position and the unlocking position by a solenoid (not illustrated) controlled by the controller 24.

As illustrated in FIG. 1, when the locking member 21 is at the locking position, the locking member 21 locks the cover 3 to the closed position. As illustrated in FIG. 2, when the locking member 21 is at the unlocking position, the locking member 21 permits movement of the cover 3 from the closed position to the open position.

<2.2 Shutter>

The shutter 26 is movable between a first shutter position (FIG. 5) and a second shutter position (FIG. 1) in a state where the cover 3 is at the closed position. In a state where the shutter 26 is at the first shutter position, the shutter 26 is positioned between the heat roller 6B and the multilayer film 5A. The shutter 26 is positioned at the first shutter position in a state where the sheet S is not supplied to the sheet conveying portion 4. Further, the shutter 26 is positioned at the first shutter position in a state where the controller 24 is not in receipt of a layer transfer instruction. Further, the shutter 26 is positioned at the first shutter position even in a state where the cover 3 is at the open position as illustrated in FIG. 2.

On the other hand, the shutter 26 is retracted from between the heat roller 6B and the multilayer film 5A when the shutter 26 is positioned at the second shutter position. The shutter 26 is positioned at the second shutter position when the controller receives a layer transfer instruction and transfers the transfer layer 12A of the multilayer film 5A to the sheet S.

<2.3 First Temperature Sensors>

The first temperature sensors 22A and 22B are configured to measure temperature of a first member. The first member is a member that is heated by contacting with the sheet S or the multilayer film 5A that has been heated by the heat roller 6B. Alternatively, the first member may be a member that is heated by radiant heat from the sheet S or the multilayer film 5A. In the present embodiment, the first member is a portion 25 of the cover 3 as illustrated in FIG. 3. Specifically, the portion 25 of the cover 3 is positioned downstream of the pressure roller 6A in the first direction. The portion 25 of the cover 3 functions as a conveying guide for guiding the sheet S moving from the pressure roller 6A toward the conveyer roller 7A (see FIG. 1). Therefore, the portion 25 of the cover 3 contacts the sheet S conveyed from the pressure roller 6A toward the conveyer roller 7A, and is heated by the sheet S. Note that although the portion 25 of the cover 3 is employed as the first member in this embodiment as described above, the conveyer roller 7A may be employed as the first member, for example.

The first temperature sensors 22A and 22B are configured to measure temperature of the portion 25 of the cover 3, and are positioned inside the cover 3 as illustrated in FIG. 1. The first temperature sensors 22A, 22B are thermistors.

The first temperature sensor 22A is configured to measure temperature of a first part 25A of the portion 25 of the cover 3. The first part 25A is positioned within a first region A1 within which the first heater 61 is positioned. The first region A1 is a region in the widthwise direction. That is, the first temperature sensor 22A is a first region sensor.

The first temperature sensor 22B is positioned spaced away from the first temperature sensor 22A in the widthwise direction. The first temperature sensor 22B is configured to measure temperature of a second part 25B of the portion 25 of the cover 3. The second part 25B is positioned within a second region A2 within which the second heater 62 is positioned. The second region A2 is a region in the widthwise direction. That is, the first temperature sensor 22B is a second region sensor.

<2.4 Second Temperature Sensor>

The second temperature sensor 23 is configured to measure temperature of a second member. The second member is a member that is heated by the heat roller 6B in a state where the cover 3 is at the open position. In the present embodiment, the second member is the shutter 26 illustrated in FIGS. 1 and 5.

Therefore, the second temperature sensor 23 is configured to measure temperature of the shutter 26. The second temperature sensor 23A is a thermistor. The second temperature sensor 23 is attached to the shutter 26. The second temperature sensor 23A is positioned at the opposite side of the shutter 26 from the pressure roller 6A.

<2.5 Controller>

As illustrated in FIG. 6, the controller 24 is electrically connected to the first temperature sensors 22A and 22B and the second temperature sensor 23. The controller 24 is configured to receive electrical signals from the first temperature sensors 22A and 22B and the second temperature sensor 23. Further, the controller 24 is configured to control operations of the locking member 21 and shutter 26. A control circuit board provided with a CPU and memories such as RAM and ROM may be employed as the controller 24. Alternatively, a control circuit board provided with an ASIC may be employed as the controller 24.

3. Control by Controller

Figure 7:
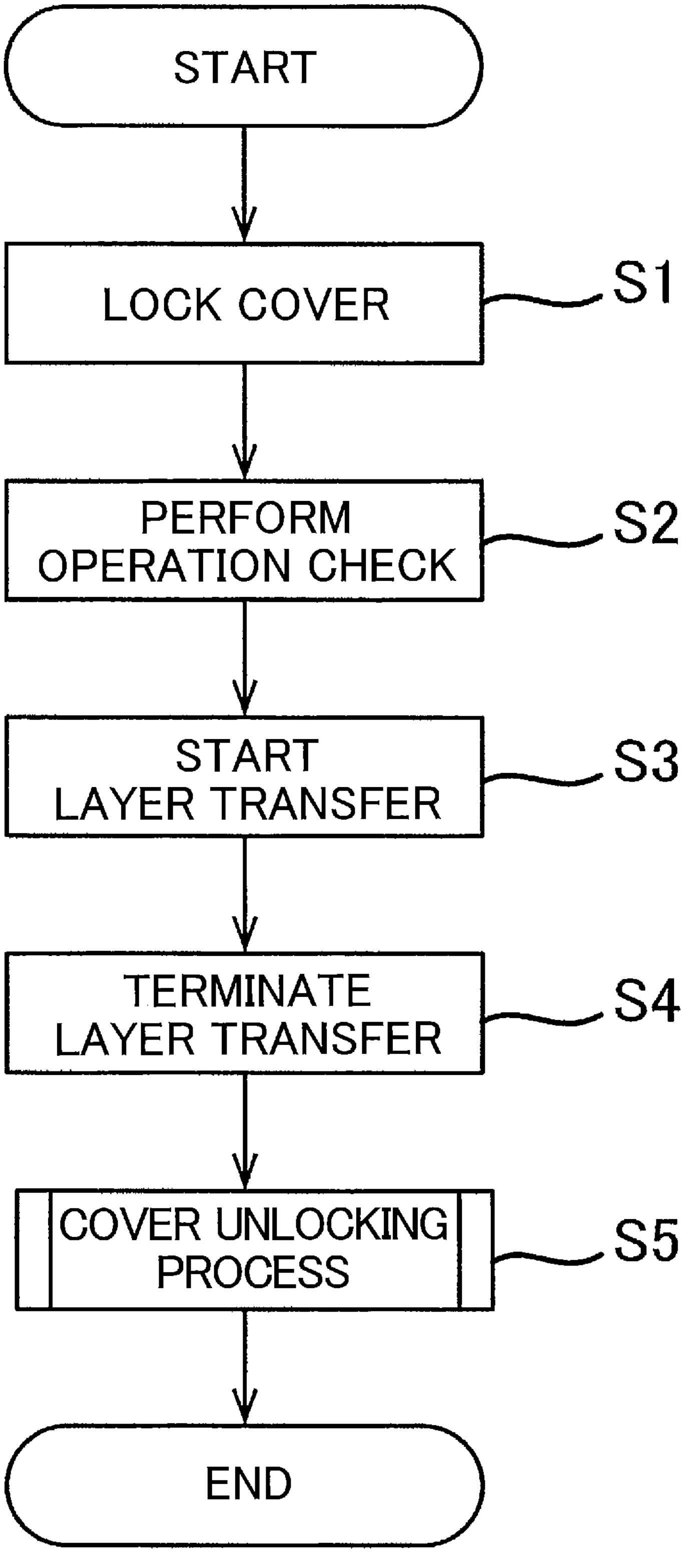
FIG. 7 is a flowchart illustrating a control process performed in a controller illustrated in FIG. 6.

A control process performed by the controller 24 will next be described with reference to FIGS. 7 through 9. As illustrated in FIG. 7, when the layer transfer device 1 starts up, the controller 24 controls the locking member 21 to lock the cover 3 to the closed position (S1), and then checks the operation of the layer transfer device 1 (S2).

In a case where no abnormality is found in the layer transfer device 1 in the operation check (S2), the controller 24 starts a layer transfer operation in response to receiving a layer transfer instruction (S3). The layer transfer instruction may be inputted from an external personal computer to the controller 24 of the layer transfer device 1. Alternatively, the layer transfer instruction may be inputted from an operation panel (not illustrated) of the layer transfer device 1 to the controller 24.

The controller 24 stops the layer transfer operation in a case where a sheet sensor (not illustrated) does not detect the sheet S for more than a predetermined period of time (S4). Note that the sheet sensor is positioned between the sheet supply opening 2A and the sheet conveying portion 4.

Then, the controller 24 performs a cover unlocking process of unlocking the cover 3 (S5). Note that the controller 24 may start the cover unlocking process after locking the cover 3 to the closed position for a predetermined time period after terminating the layer transfer operation and turning off the heat roller 6B.

In the cover unlocking process (S5), the controller 24 performs a temperature acquiring process (S51), an evaluated temperature determination process (S52), a judgement process (S53), and an unlocking process (S54).

<3.1 Temperature Acquiring Process>

In the temperature acquiring process (S51), the controller 24 acquires temperatures measured by the first temperature sensors 22A and 22B and the second temperature sensor 23. Each of the temperatures measured respectively by the first temperature sensors 22A and 22B is a first temperature. In a case where a plurality of first temperature sensors is provided in the layer transfer device 1, the number of measured first temperatures is the same as the number of the plurality of first temperature sensors. That is, two first temperatures are measured in the present embodiment; one is measured by the first temperature sensor 22A and the other by the first temperature sensor 22B. Further, the temperature measured by the second temperature sensor 23 is a second temperature.

Figure 9:
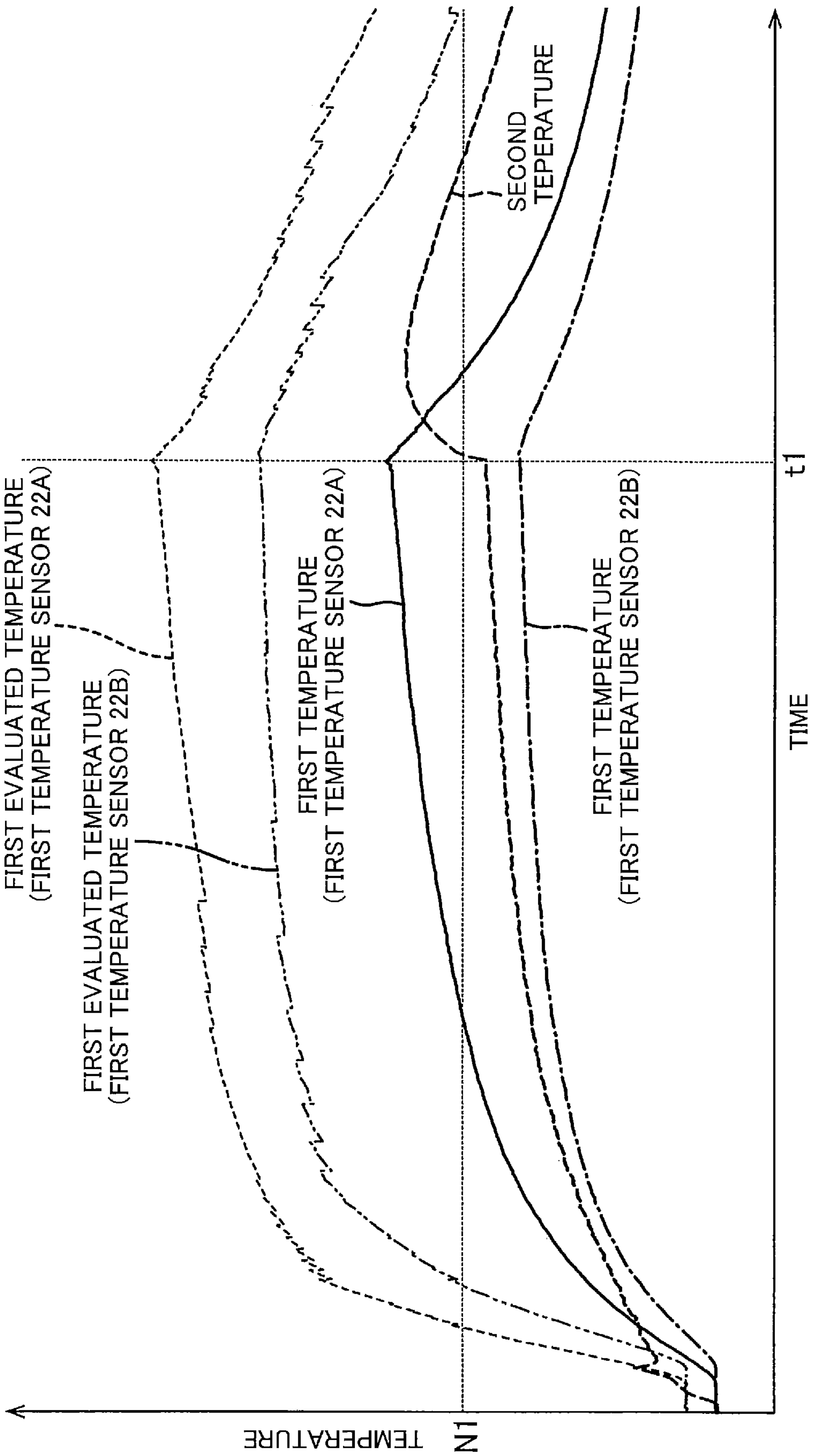
FIG. 9 is a graphical representation showing changes in first temperatures, a second temperature, and first evaluated screening temperatures.

As illustrated in FIG. 9, the first temperature has a tendency to start lowering after the time point t1 at which the layer transfer operation is terminated. This is because after the time point t1 at which the layer transfer operation is terminated, the heat roller 6B moves to the second position and the shutter 26 is placed in the first shutter position, thereby cooling the portion 25 of the cover 3.

On the other hand, the second temperature has a tendency to once rise after the time point t1 and then to lower. This is because after the time point t1 at which the layer transfer operation is terminated, the shutter 26 positioned at the first shutter position is once heated by the heat roller 6B positioned at the second position and is then cooled.

<3.2 Evaluated Temperature Determination Process>

In the evaluated temperature determination process (S52), first evaluated temperatures T1 and a second evaluated temperature T2 are determined based on the first temperatures and the second temperature which are acquired in the temperature acquiring process (S51).

The first evaluated temperature T1 is determined based on the first temperature. Specifically, the controller 24 determines the first evaluated temperature by weighting the first temperature using a predetermined function. More specifically, the controller 24 determines a first evaluated temperature (T1) by multiplying a first temperature (x) by a first coefficient (a) and adding a second constant (b) to the result of the multiplication. In this way, the function "f(x)=ax+b" is used to weight the first temperature. That is, the first evaluated temperature (T1)=the first coefficient (a)×the first temperature (x)+the second constant (b). The first evaluated temperature T1 is an example of the "specific evaluated temperature."

The predetermined function, the first coefficient (a), and the second constant (b) are stored in advance in a data table in the memory of the controller 24. Incidentally, in a case where a plurality of first temperature sensors is provided in the layer transfer device 1, the number of first evaluated temperatures determined by the controller 24 is the same as the number of the plurality of first temperature sensors. That is, according to the present embodiment, two first evaluated temperatures are determined; one is based on the first temperature measured by the first temperature sensor 22A, and the other is based on the first temperature measured by the first temperature sensor 22B.

As described above, the first temperature sensors 22A and 22B are provided inside the cover 3. Therefore, the first temperature is lower than the actual temperature of the guide surface 3A (FIG. 1) of the cover 3. Taking this fact into consideration, the first evaluated temperature T1 is determined by weighting the first temperature using the predetermined function (i.e., using the predetermined coefficient and constant), thereby approximating the first evaluated temperature T1 to the actual temperature of the guide surface 3A. Note that, as described above, the guide surface 3A is a surface contacting the sheet S when the cover 3 guides the sheet S.

The second evaluated temperature T2 is determined based on the second temperature. According to the present embodiment, the controller 24 determines the second temperature as the second evaluated temperature T2. That is, the second temperature is used as it is as the second evaluated temperature T2.

<3.3 Judgement Process>

In the judgement process (S53), the controller 24 determines individually whether each of the first evaluated temperatures T1 and second evaluated temperature T2 is lower than a first threshold value N1. That is, the controller 24 determines, for each of the first evaluated temperatures T1 and second evaluated temperature T2, whether the temperature is lower than a first threshold value N1. For example, the first threshold value N1 is 85° C.

In a case where the controller 24 determines that at least one of the first evaluated temperatures T1 and second evaluated temperature T2 is equal to or higher than the first threshold value N1 (S53: No), the controller 24 again acquires the temperatures measured by the first temperature sensors 22A and 22B and the second temperature sensor 23 (S51), without performing the unlocking process (S54). That is, the controller 24 does not unlock the cover 3 in a case where at least one of the first evaluated temperature T1 and second evaluated temperature T2 is equal to or higher than the first threshold value N1. As a result, the controller 24 places the locking member 21 in the locking position in a case where at least one of the first evaluated temperature T1 and second evaluated temperature T2 is equal to or higher than the first threshold value N1.

<3.4 Unlocking Process>

On the other hand, in a case where the controller 24 determines the first evaluated temperature T1 and second evaluated temperature T2 are all lower than the first threshold value N1 (S53: Yes), the controller 24 performs the unlocking process (S54).

In the unlocking process (S54), the controller 24 places the locking member 21 in the unlocking position in a case where the first evaluated temperature T1 and second evaluated temperature T2 are all lower than the first threshold value N1. That is, in the present embodiment, the locking member 21 is placed in the unlocking position in a case where all of the following three temperatures are lower than the first threshold value N1: the first evaluated temperature T1 based on the first temperature measured by the first temperature sensor 22A, the first evaluated temperature T1 based on the first temperature measured by the first temperature sensor 22B, and the second evaluated temperature T2 based on the second temperature measured by the second temperature sensor 23. Hence, the cover 3 is unlocked.

4. Function and Effect (1) The layer transfer device 1 includes the first temperature sensors 22A and 22B and the second temperature sensor 23 as illustrated in FIGS. 1 and 3. The first temperature sensors 22A and 22B are configured to measure temperature of the portion 25 of the cover 3. The second temperature sensor 23 is configured to measure temperature of the shutter 26. The portion 25 of the cover 3, when guiding the sheet S that has been heated by the heat roller 6B, contacts that sheet S and thus is heated. The shutter 26 is heated by the heat roller 6B positioned at the second position as illustrated in FIG. 5.

Figure 8:
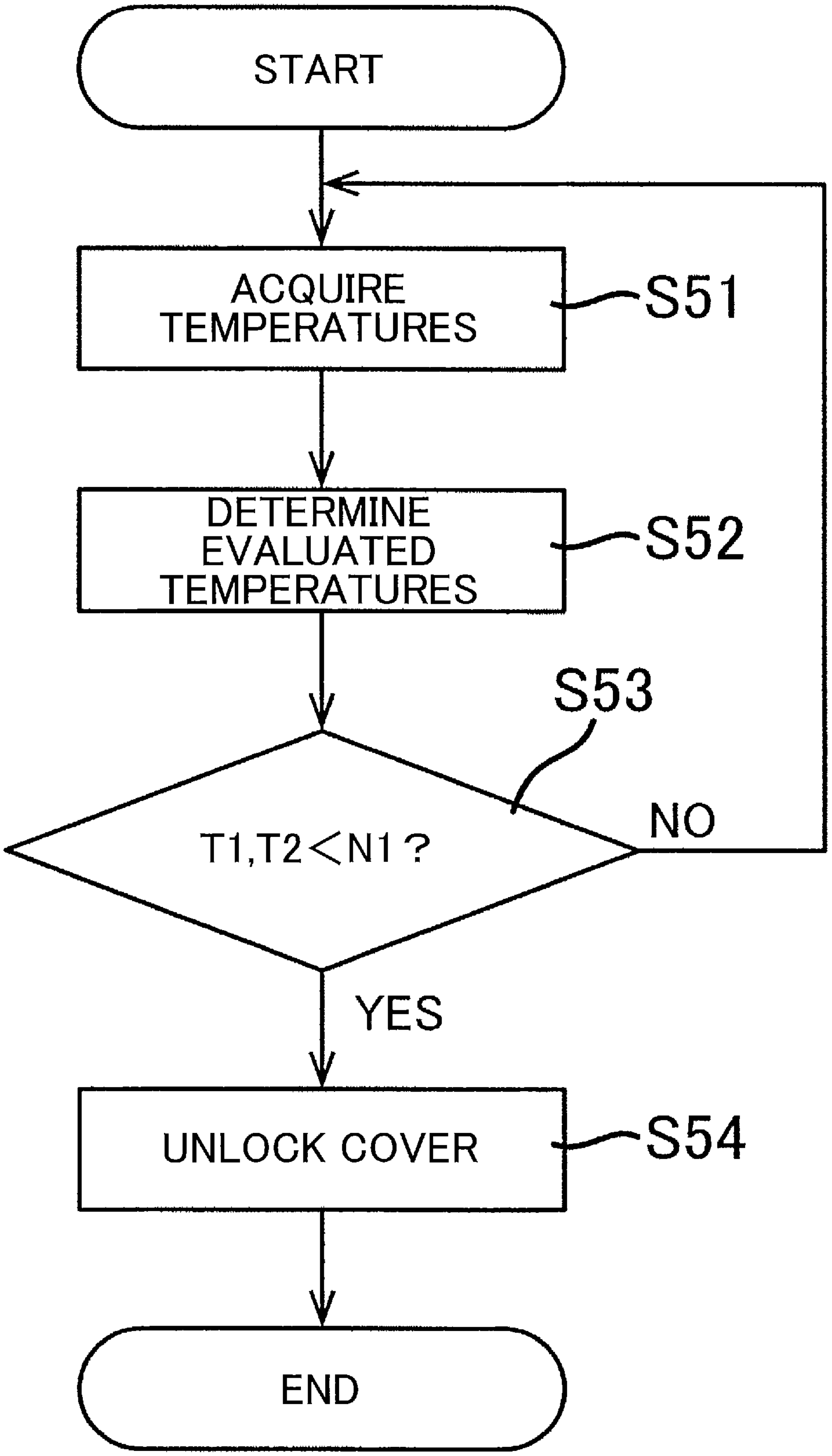
FIG. 8 is a flowchart illustrating a cover unlocking process illustrated in FIG. 7.

As illustrated in FIG. 8, the controller 24 determines the first evaluated temperatures T1 based on the first temperatures measured by the first temperature sensors 22A and 22B, and determines the second evaluated temperature T2 based on the second temperature measured by the second temperature sensor 23 (S51, S52).

The controller 24 places the locking member 21 (see FIG. 1) in the locking position in a case where at least one of the first evaluated temperatures T1 and second evaluated temperature T2 is equal to or higher than the first threshold value N1 (see FIG. 9) (S53: No). That is, the cover 3 is locked to the locking position in a case where the portion 25 of the cover 3 or the shutter 26 is excessively heated.

The controller 24 places the locking member 21 in the unlocking position in a case where the first evaluated temperatures T1 and second evaluated temperature T2 are all lower than the first threshold value N1 (S53: Yes, S54). Hence, the cover 3 is unlocked after the portion 25 of the cover 3 and the shutter 26 are cooled down.

Therefore, a user can easily perform replacement of the multilayer film 5A or removal of a jammed sheet S since members around the multilayer film 5A, such as the portion 25 of the cover 3 and the shutter 26, have been cooled down.

(2) Further, the layer transfer device 1 includes the heat roller 6B including the first heater 61 and the second heater 62. The first heater 61 is configured to heat the center portion in the widthwise direction of the heat roller 6B, and the second heater 62 is configured to heat one end portion in the widthwise direction of the heat roller 6B. The layer transfer device 1 further includes the plurality of first temperature sensors 22A and 22B. The first temperature sensor 22A is positioned within the first region A1 in the widthwise direction within which the first heater 61 is positioned. The first temperature sensor 22B is positioned within the second region A2 in the widthwise direction within which the second heater 62 is positioned.

With this structure, temperature of the cover 3 can be measured in accordance with the positions in the widthwise direction of the first heater 61 and second heater 62. Accordingly, even if the heating region by the heat roller 6B is changed in accordance with the widthwise size of the sheet S, the cover 3 can be locked until the portion 25 of the cover 3 has been cooled down.

(3) Further, the first temperatures measured by the first temperature sensors 22A and 22B are lower than the actual temperature of the guide surface 3A (see FIG. 1) of the cover 3. However, the controller 24 of the layer transfer device 1 determines the first evaluated temperature T1 by weighting the first temperature using the predetermined function (i.e., using the predetermined coefficient and constant) as illustrated in FIGS. 8 and 9 (S52). Therefore, the first evaluated temperature T1 can be approximated to the actual temperature of the guide surface 3A of the cover 3.

(4) The controller 24 may perform the cover unlocking process (S5, see FIG. 7) after locking the cover 3 to the closed position for a predetermined time period after terminating a layer transfer operation (see FIG. 7) and turning off the heat roller 6B. The cover 3 and the shutter 26 can further be cooled by locking the cover 3 to the closed position for the predetermined time period after turning off the heat roller 6B. Consequently, the user can open the cover 3 in a state where the portion 25 of the cover 3 and the shutter 26 have been further cooled.

5. Modifications

First and second modifications will be described with reference to FIGS. 10 and 11 wherein like parts are designated by the same reference numerals as those shown in the above-described embodiment to avoid duplicating description. The above-described embodiment, the first modification and the second modification may be suitably combined with each other.

5.1 First Modification

Figure 10:
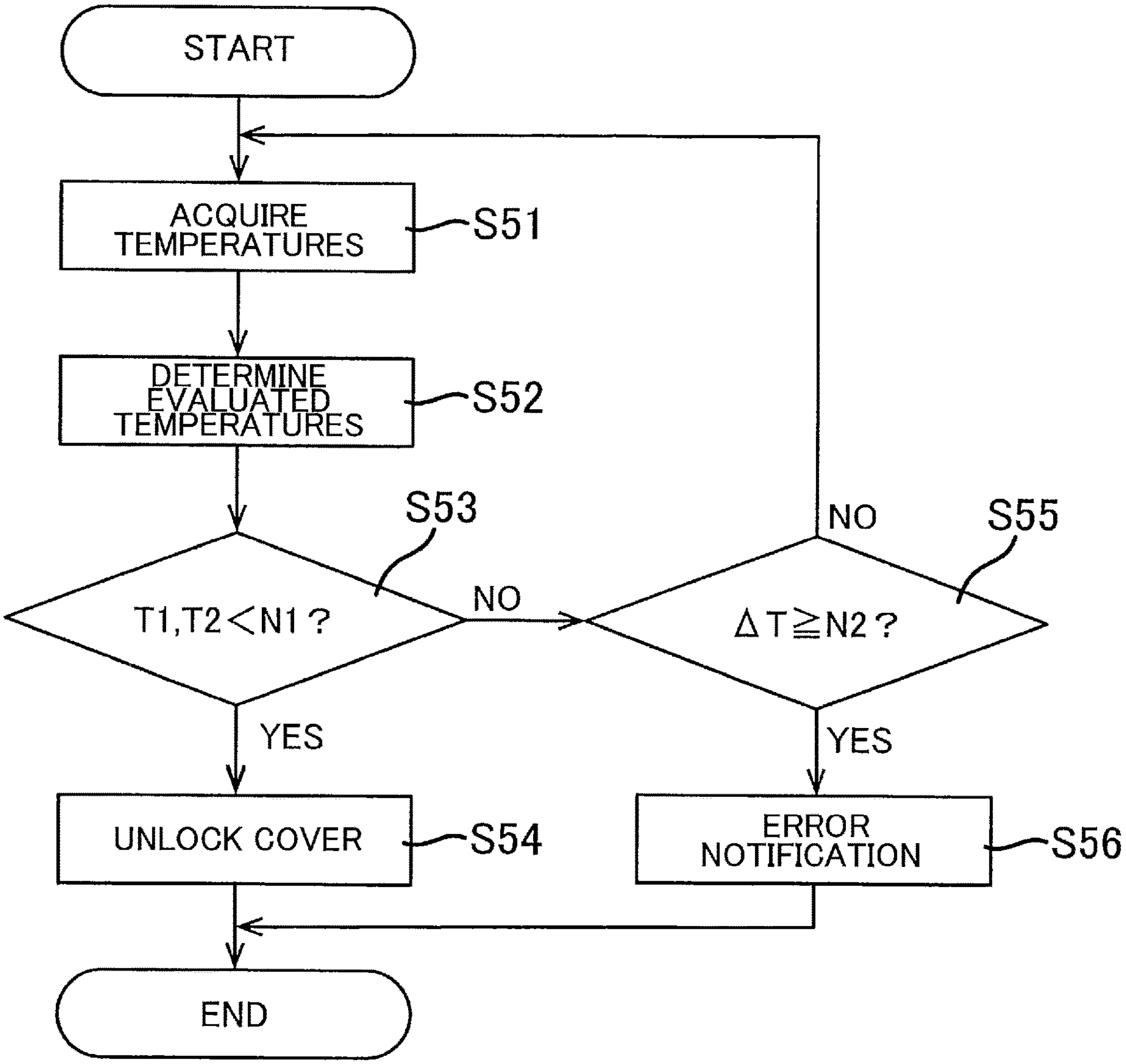
FIG. 10 is a flowchart illustrating a cover unlocking process according to a first modification.

As illustrated in FIG. 10, in a case where at least one of the first evaluated temperatures and second evaluated temperature is equal to or higher than the first threshold value N1 (S53:No), the controller 24 determines whether the difference (hereinafter referred to as "difference ΔT") between the highest and the lowest of the determined evaluated temperatures (i.e., the first evaluated temperatures T1 and second evaluated temperature T2 in this modification) is equal to or higher than a second threshold value N2 (S55). In a case where the difference ΔT is equal to or higher than the second threshold value N2 (S55: Yes), the controller 24 determines that there is a malfunction in the temperature sensor that has measured the temperature corresponding to the lowest evaluated temperature, and thus notifies of an error (S56). For example, the second threshold value N2 is 20° C. The difference ΔT is an example of the "specific difference."

Specifically, in a case where the first temperature sensors 22A and 22B work properly and thus the first evaluated temperatures T1 are 90° C. which is higher than the first threshold value N1 while the second evaluated temperature T2 is always 25° C. due to a malfunction of the second temperature sensor 23, the controller 24 determines that the first evaluated temperatures T1 are higher than the first threshold value N1 (S53: No) and the difference ΔT between the highest and the lowest of the first evaluated temperatures T1 and second evaluated temperature T2 is higher than the second threshold value N2 (S55: Yes). In this case, the controller 24 notifies of an error (S56) without unlocking the cover 3.

Incidentally, the method of notifying of an error is not limited. For example, an error message may be displayed on the display of a personal computer connected to the layer transfer device 1. Alternatively, the notification of an error may be performed by voice.

According to the first modification, malfunction of the first temperature sensors 22A and 22B and the second temperature sensor 23 can be found. Further, the first modification exhibits the same function and effect as those of the above-described embodiment.

5.2 Second Modification

Figure 11:
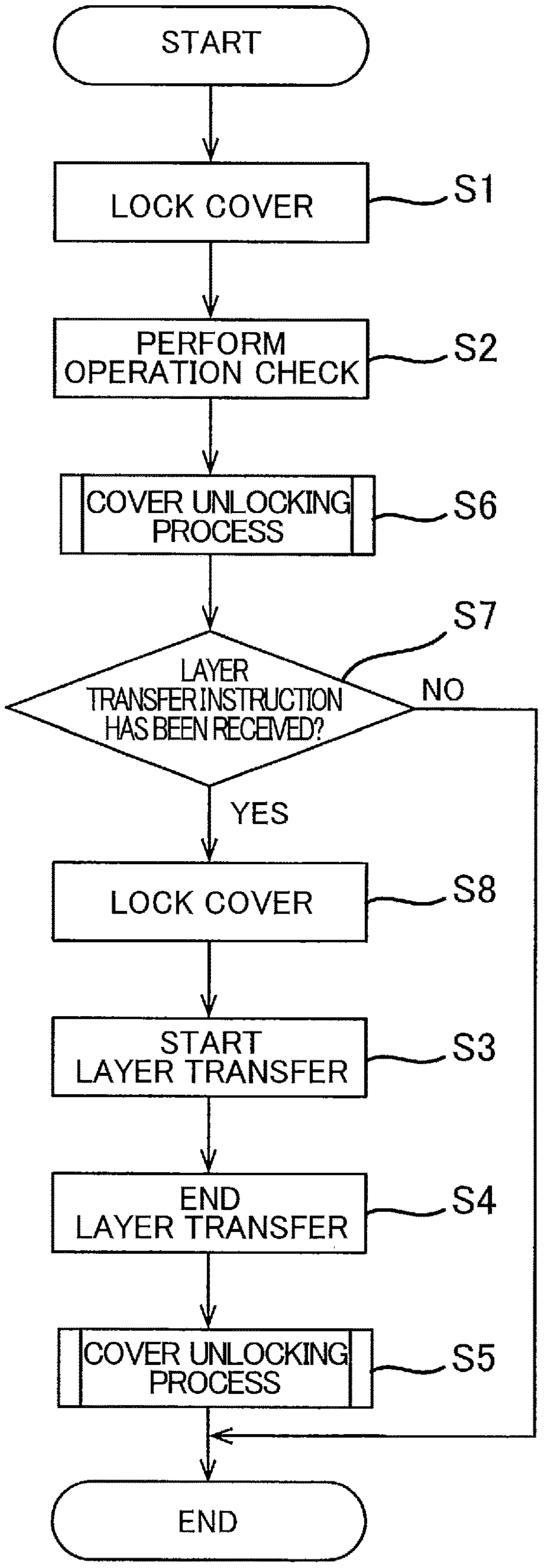
FIG. 11 is a flowchart illustrating a control process performed in a controller according to a second modification.

As illustrated in FIG. 11, the cover unlocking process (S5, S6) is performed not only subsequently to the termination of a layer transfer operation (S4) but also subsequently to the operation check (S2). In this case, the controller 24 performs the cover unlocking process (S6) subsequently to the operation check (S2) for the layer transfer device 1. Thereafter, if a layer transfer instruction is inputted (S7: Yes), the controller 24 locks the cover 3 (S8) and then starts a layer transfer operation (S3).

While the description has been made in detail with reference to specific embodiment and modifications, it would be apparent to those skilled in the art that various changes and modifications may be made therein.

What is claimed is:

1. A layer transfer device comprising:

a housing having an opening;

a cover movable between a closed position in which the cover closes the opening and an open position in which the cover opens the opening;

a locking member movable between a locking position in which the locking member locks the cover to the closed position and an unlocking position in which the locking member permits movement of the cover from the closed position to the open position;

a heat roller positioned inside the housing, the heat roller being configured to heat a multilayer film and a sheet in a state where the cover is at the closed position, the multilayer film and the sheet being conveyed in a first direction in an overlaid state with each other, the multilayer film including a support layer and a supported layer, the supported layer including a transfer layer to be transferred to the sheet;

a plurality of temperature sensors including:

a first sensor configured to measure temperature of a first member, the first member being heated by one of the multilayer film and the sheet that have been heated by the heat roller; and a second sensor configured to measure temperature of a second member, the second member being heated by the heat roller; and a controller configured to perform:

(a) determining a plurality of evaluated temperatures on the basis of a plurality of temperatures measured by the plurality of temperature sensors;

(b) placing the locking member in the locking position in a case where at least one of the plurality of evaluated temperatures determined in (a) is equal to or higher than a first threshold value; and (c) placing the locking member in the unlocking position in a case where all of the plurality of evaluated temperatures determined in (a) are lower than the first threshold value.

2. The layer transfer device according to claim 1, further comprising:

a film unit holding the multilayer film, the film unit being mountable in the housing through the opening in a state where the cover is at the open position.

3. The layer transfer device according to claim 2, further comprising:

a pressure roller provided on the cover, wherein the pressure roller and the heat roller are configured to nip the multilayer film therebetween in a state where the film unit is mounted in the housing and the cover is at the closed position.

4. The layer transfer device according to claim 1, wherein the first member is a portion of the cover.

5. The layer transfer device according to claim 1, wherein the second member is a shutter, the shutter being movable between a first shutter position in which the shutter is positioned between the heat roller and the multilayer film and a second shutter position in which the shutter is retracted from between the heat roller and the multilayer film.

6. The layer transfer device according to claim 1, wherein the plurality of temperature sensors further includes a third sensor configured to measure temperature of the first member, wherein the heat roller includes:

a first heater; and a second heater positioned at a position different from that of the first heater in a widthwise direction of the sheet, the widthwise direction crossing the first direction, wherein the first sensor is positioned within a first region in the widthwise direction within which the first heater is positioned, and wherein the third sensor is positioned within a second region in the widthwise direction within which the second heater is positioned.

7. The layer transfer device according to claim 1, wherein the plurality of evaluated temperatures determined in (a) includes a specific evaluated temperature, the specific evaluated temperature being the evaluated temperature determined on the basis of the temperature measured by the first sensor, and wherein, in the determining in (a), the controller determines the specific evaluated temperature by weighting, using a predetermined function, the temperature measured by the first sensor.

8. The layer transfer device according to claim 1, wherein the controller is configured to further perform:

(d) determining, in a case where at least one of the plurality of evaluated temperatures determined in (a) is equal to or higher than the first threshold value, whether a specific difference is equal to or greater than a second threshold value, the specific difference being the difference between the highest and the lowest of the plurality of evaluated temperatures determined in (a); and (e) determining, in response to determining in (d) that the specific difference is equal to or greater than the second threshold value, that there is a malfunction in the temperature sensor that has measured the temperature corresponding to the lowest evaluated temperature.

9. The layer transfer device according to claim 1, wherein the controller is configured to further perform:

(f) locking the cover to the closed position for a predetermined period of time after turning off the heat roller.

* * * * *